United States Patent Office 2,838,520
Patented June 10, 1958

2,838,520

NEW OXDIAZOLES

Willy Mueller, Riehen, and Adolf Emil Siegrist, Basel, Switzerland, assignors to Ciba Limited, Basel, Switzerland, a Swiss firm No Drawing. Application October 10, 1955
Serial No. 539,655

Claims priority, application Switzerland July 7, 1954

6 Claims. (Cl. 260—307)

This is a continuation in part of our copending application Serial No. 520,369 (which has been abandoned since the filing of the present application).

This invention provides new oxdiazoles which like, for example, the compound of the formula (1)
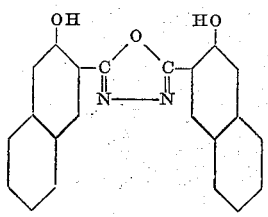

are free from groups imparting color and contain at least one oxdiazole ring and bound directly to that ring at least one aromatic nucleus having a hydroxy group bound thereto.

The invention also provides a process for making these oxdiazoles, wherein an N(1):N(2)-diacyl-hydrazine which contains no groups imparting color and in which both of the acyl groups bound to the hydrazine radical are derived from carboxylic acid groups and at least one of the —CO— groups is bound to an aromatic nucleus containing a hydroxy group, is treated with an agent capable of bringing about ring closure.

The N(1):N(2)-diacyl-hydrazines can be made by acylating hydrazine; for example, hydrazine may be acylated at both nitrogen atoms so as to introduce two identical radicals of the constitution given above or introducing in stages two different acyl radicals, of which at least one is of the aforesaid constitution. As acylating agents there are advantageously used functional derivatives, for example, methyl esters or halides, for example, bromides or especially chlorides, of the carboxylic acids used. There may be mentioned, for example, the following possibilities:

(a) Hydrazine is acylated at both nitrogen atoms with a derivative of a carboxylic acid free from groups imparting color and of which the carboxylic acid group is bound to an aromatic nucleus containing a hydroxyl group as a further substituent.

(b) Hydrazine is acylated in either order of succession with two different carboxylic acid derivatives of the constitution mentioned under (a).

(c) Hydrazine is acylated in either order of succession with two different acid derivatives, of which one is of the constitution mentioned under (a) and the other is not of that constitution but is likewise free from groups imparting color. One of the acid derivatives, for example, the derivative last mentioned, may be the derivative of a dicarboxylic acid, for example, maleic anhydride, so that the diacyl-hydrazine formed will contain a free carboxylic acid group. By the use of a suitable ring-closing agent such, for example, as thionyl chloride, the carboxylic acid is converted into a carboxylic acid halide group simultaneously with the ring closure. The resulting oxdiazole containing a carboxylic acid halide group can then be condensed with an arylamine, a diamine or hydrazine or a hydrazide, and in the last mentioned cases further oxdiazole ring-closure may be brought about.

(d) Hydrazine, one or two monocarboxylic acid derivatives and a dicarboxylic acid derivative are condensed together in a suitable order of succession in the molecular ratio 2:2:1, whereby for two molecular proportions of hydrazine and one molecular proportion of the dicarboxylic acid derivative there may be used either two molecular proportions of the same monocarboxylic acid derivative or one molecular proportion of each of two different monocarboxylic acid derivatives, and at least one acid derivative must be of the constitution given under (a).

Thus, for example, two molecular proportions of an ester of a hydroxy-arylcarboxylic acid may be condensed with two molecular proportions of hydrazine to form the carboxylic acid hydrazide, and two molecular proportions of the latter may be further condensed with one molecular proportion of a dihalide of any desired carboxylic acid.

For the sake of simplicity the products so obtained are also referred to as diacyl-hydrazines, notwithstanding that they contain two hydrazine groups and four acyl groups.

As carboxylic acids of the constitution given under (a) there may be used, for example, derivatives of carboxylic acids of which the carboxylic acid group is bound to a carbon atom of an aromatic 6-membered ring fused to a further ring, this ring system containing a hydroxyl group. Advantageous results are obtained, for example, with derivatives of the carboxylic acids of the formula (2)

in which $R_1$ represents a cyclic radical fused in the manner indicated above to the 6-membered ring I. As examples of such compounds there may be mentioned 2-hydroxy-diphenylene oxide-3-carboxylic acid, 2-hydroxy-carbazole-3-carboxylic acid, 2-hydroxyanthracene-3-carboxylic acid and especially 2-hydroxynaphthalene-3-carboxylic acid.

As carboxylic acid derivatives not having the constitution given under (a) and to be used according to (c), there may be used a derivative of any desired carboxylic acid free from groups imparting color.

Any desired dicarboxylic acid derivative may be used according to (d), provided that it is free from groups imparting color. In some cases it is of advantage to use dichlorides of simple dicarboxylic acids such, for example, as those of oxalic acid, fumaric acid, isophthalic acid or terephthalic acid.

The reaction of the hydrazine with the carboxylic acid derivative may be carried out by methods in themselves known, advantageously in an organic solvent. As functional derivatives of carboxylic acids of the type of 2-hydroxy-naphthalene - 3 - carboxylic acid it is generally of advantage to use the methyl esters. In some cases the carboxylic acid halides can also be used.

It is generally of advantage so to select the starting materials that the resulting diacyl-hydrazine of the above constitution contain no groups imparting solubility in water, especially no sulfonic acid or carboxylic acid groups.

Especially valuable oxdiazoles are obtained, for example, from diacyl-hydrazines of the formula $R_1$—CO—HN—NH—OC—$R_2$ in which $R_1$ and $R_2$ each represent an aromatic nucleus containing at most two 6-membered rings and at least one of which radicals contains a hydroxyl group bound to an aryl carbon atom. The hydroxyl group is advantageously in a position vicinal to the —CO— group.

As agents capable of bringing about ring closure there come into consideration, for example, those which do not have a sulfonating action. Especially good results are usually obtained with thionyl chloride. In some cases it is suitable to use as the ring-closing agent anhydrous aluminium chloride. The ring-closure is advantageously brought about by heating the diacyl-hydrazine with the ring-closing agent in an inert organic solvent such, for example, as chlorobenzene or nitrobenzene.

When there is used as a ring-closing agent one which is also capable of bringing about sulfonation, for example, sulfuric acid having a content of free sulfur trioxide (oleum) in some cases sulfonation in an aryl radical occurs in addition to ring closure. For this reaction it is generally not necessary to prepare in a separate operation and isolate the diacyl-hydrazine to be used as starting material. Thus from one molecular proportion of hydrazine (advantageously in the form of hydrazine sulfate) and 2 molecular proportions of a hydroxyaryl carboxylic acid or from one molecular proportion of a monoacyl-hydrazine and one molecular proportion of carboxylic acid, a hydroxyaryl-oxdiazole containing a sulfonic acid group is obtained by reaction with oleum without the need to separate the intermediate product.

The new oxdiazoles of this invention are valuable compounds which are suitable for a variety of purposes. They can be used, for example, as intermediates for the manufacture of dyestuffs. For instance, many of these compounds may be used as coupling components in the manufacture of valuable azo-dyestuffs, especially azo-pigments.

Furthermore, the new oxdiazoles possess the property of absorbing ultraviolet rays, especially those of short wavelength, and are therefore suitable for protecting a very wide variety of materials against the known harmful effects of those rays. As materials which can be protected against ultraviolet rays by the new oxdiazoles there may be mentioned above all organic materials, for example, textiles, foils and lacquers.

Further valuable compounds of the present invention are those which correspond to the formula (3)
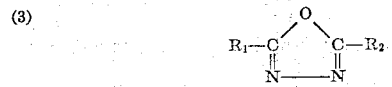

in which $R_1$ and $R_2$ each represent an aromatic radical at least one of which contains a hydroxyl group bound to an acyl carbon atom and at least one halogen atom, preferably a chlorine atom, and at least one of the radicals R and $R_1$ contains a sulfonic acid group.

Of particular interest are the compounds of Formula 3 wherein $R_1$ and $R_2$ represent benzene radicals and which contain two or more than two chlorine atoms in the radical in which the hydroxyl group is present. As example there may be mentioned 2:5-bis-[2'-hydroxy-3':5'-dichlorophenyl-(1')]-1:3:4-oxdiazole-disulfonic acid of the formula (4)
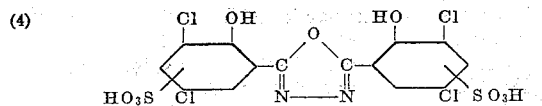

The compounds of the Formula 3 when applied in form of a salt, preferably an alkali salt, possess good affinity to fibers of animal origin, such as for instance wool, furs, hairs, feathers. By fixation of the compounds of the above composition said materials are well protected against damage done by animal parasites, particularly by the larvae of the clothes moth (*Tineola biseliella*). Generally, small quantities of the oxdiazole compounds in the order of magnitude of a few percent, calculated on the fibrous material, have a considerable effect. The oxdiazole compounds may be used alone, or together with other protecting agents or with dyestuffs.

The following examples illustrate the invention, the parts and percentages being by weight unless otherwise stated and the relationship of parts by weight to parts by volume being the same as that of the kilogram to the liter:

*Example 1*

40.4 parts of 2-hydroxynaphthalene-3-carboxylic acid hydrazide are stirred with 20 parts of pyridine in 500 parts of chlorobenzene. The mixture is heated to 90–100° C. and 42 parts of 2-hydroxynaphthalene-3-carboxylic acid chloride are added. The reaction product separates in the form of a voluminous insoluble precipitate. The mixture is heated for two hours at 120–130° C., then allowed to cool to 80° C. and filtered well with suction. The filter residue is washed with alcohol and dried at 70–80° C. There is obtained an almost colorless powder which dissolves to give a yellow coloration in dilute sodium hydroxide solution with the addition of a small amount of alcohol. It dissolves in concentrated sulfuric acid to give a weak pale yellow coloration.

37.2 parts of the dihydrazide so obtained of the formula

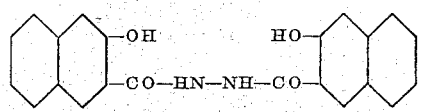

are stirred in 250 parts of dry nitrobenzene, and 15 parts of anhydrous aluminium chloride are introduced at room temperature. The temperature thereupon rises to 35–40° C. and hydrogen chloride gas escapes. The mixture is then slowly heated to 70–80° C., a stream of hydrogen chloride gas escaping. A thick syrupy yellow mass is formed. The mixture is then allowed to cool and poured on to 500 parts of ice water, which has been acidified with 30 parts of hydrochloric acid of 30 percent strength. The whole is stirred for 2 hours at room temperature. A homogeneous suspension is formed. The suspension is filtered with suction, and the filter residue is first washed with water and then with a small amount of alcohol. The yellowish residue is dissolved in 500 parts of alcohol with the addition of 15 parts of sodium hydroxide solution of 30 percent strength, the yellow solution is filtered to remove insoluble impurities, and the condensation product is precipitated by the slow dropwise addition of 30 parts of hydrochloric acid of 30 percent strength. There is obtained a white precipitate which is filtered off with suction and washed with water until neutral.

The condensation product of the formula

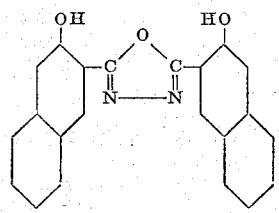

is an almost colorless powder. It dissolves with a yellow coloration in dilute solutions of caustic alkali with the addition of alcohol. The alkaline solution exhibits a strong green-yellow fluorescence in ultraviolet light. It dissolves in concentrated sulfuric acid to give an intense yellow coloration. It melts at 337–338° C. It can be used as a coupling component or as an agent for absorbing ultraviolet rays.

*Example 2*

202 parts of 2-hydroxynaphthalene-3-carboxylic acid methyl ester (melting at 71° C.) are dissolved in 400 parts of ethanol and heated at the boil with 55 parts of hydrazine hydrate for one hour under reflux. The 2-hydroxynaphthalene-3-carboxylic acid hydrazide separates even at the boiling temperature in the form of handsome yellow crystals. The whole is allowed to cool, filtered with suction, and the filter residue is washed with a small amount of cold ethanol. After drying the product, there are obtained about 198 parts of 2-hydroxynaphthalene-3-carboxylic acid hydrazide in the form of pale yellow lamellae having a fatty lustre and melting at 209–211° C.

40.4 parts of 2-hydroxynapthalene-3-carboxylic acid hydrazide are stirred in 300 parts of chlorobenzene and heated to 120° C. In 15 minutes 35 parts of para-chlorobenzoyl chloride are run in. There is obtained a thick white paste and a stream of hydrogen chloride gas escapes. The whole is stirred at 120°–130° C. until the evolution of hydrogen chloride ceases. The condensation product of the formula

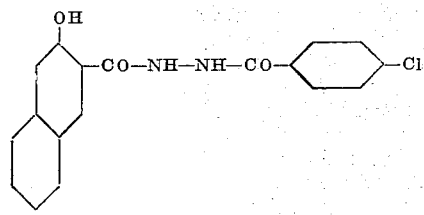

is an almost colorless powder, which dissolves in dilute alkalies with a yellowish coloration. In concentrated sulfuric acid it dissolves to give a pale yellow coloration. It melts at 294–295° C.

The paste is then allowed to cool to 20° C., and 30 parts of aluminium chloride are introduced while stirring well. The temperature then increases to 35–40° C., and hydrogen chloride escapes. The mixture is then slowly heated to 70–80° C. during which the splitting off of hydrogen chloride becomes very vigorous. There is obtained a yellow suspension which can be filtered well. The temperature is maintained until practically no more hydrogen chloride escapes, and is then allowed to cool to 40° C. and filtered. The residue is introduced into a mixture of 500 parts of ice water and 50 parts of hydrochloric acid of 30 percent strength, and the adherent chlorobenzene is distilled off with steam. The mixture is then filtered and the filter residue is washed with water. The filter residue is dissolved in 400 parts of alcohol with 30 parts of sodium hydroxide solution of 30 percent strength, filtered to remove a weak turbidity, and the condensation product is precipitated from the filtrate by the addition of 50 parts of hydrochloric acid of 30 percent strength. By filtering and drying the filter residue there is obtained the compound of the formula.

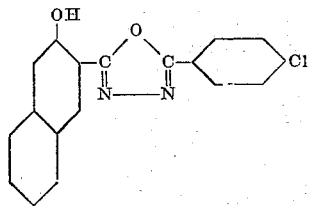

in the form of an almost colorless loose powder melting at 297–299° C. It is practically insoluble in organic solvents. In concentrated sulfuric acid it dissolves with an intense yellow coloration. When dissolved in alcoholic solutions of caustic alkalies it yields a yellow solution and exhibits a strong green-yellow fluorescence in ultraviolet light. The new compound can be used as a coupling component or as an absorber for ultraviolet light.

*Example 3*

The 2-[2'-hydroxynaphthyl-(3') - 1:3:4-oxdiazole described in Example 2 can also be prepared as follows:

20.2 parts of 2-hydroxynaphthalene-3-carboxylic acid hydrazide are stirred in 300 parts of toluene with 10 parts of pyridine and 17.5 parts of para-chlorobenzoyl chloride are run in at room temperature. The whole is then heated for 4 hours at 110–115° C., allowed to cool to 80° C., and the insoluble condensation product is filtered off with suction. The product is washed with a small amount of toluene and then with hot alcohol. By drying the product there are obtained 33 parts of the hydrazide of the formula given in Example 2 in the form of a white powder.

17 parts of the hydrazide so obtained are stirred in 200 parts of chlorobenzene at 110–120° C., and a current of phosgene is slowly introduced. The phosgene is completely consumed and hydrogen chloride gas escapes. 15 parts of phosgene are introduced in the course of 6 hours. Towards the end of the reaction phosgene escapes as well as hydrogen chloride gas. The current of phosgene is then stopped and the mixture is stirred for a further 2 hours at 120° C. The whole is then filtered while hot and the filter residue is washed with hot chlorobenzene and hot alcohol. By drying the product there are obtained about 16 parts of 2-[2'-hydroxynaphthyl - (3')]-5[4''-chlorophenyl - (1'')] - 1:3:4-oxdiazole.

*Example 4*

84 parts of 2:4-dihydroxybenzoyl-hydrazine (prepared as described in the Journal of the American Chemical Society, vol. 73, page 4021 (1951)), are stirred in 850 parts by volume of toluene and 70.3 parts of benzoyl chloride are introduced dropwise. The temperature is then raised to the boiling point of the toluene and the mixture is boiled for 6 hours under reflux, at the end of which time the evolution of hydrogen chloride will have practically ceased. The whole is then allowed to cool to 80° C. and 72 parts of thionyl chloride are introduced dropwise in the course of 30 minutes. The mixture is then heated to the boil and boiled for 12 hours under reflux. After cooling, the precipitated condensation product is filtered off, washed with toluene and cold alcohol and dried. After recrystallization from alcohol there is obtained a white crystalline powder of the formula

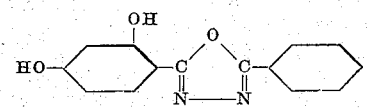

which melts at 223–225° C. It can be used as a coupling component or as an absorber for ultraviolet rays.

*Example 5*

19 parts of N:N'-di-[2-hydroxybenzoyl]-hydrazine are heated with 160 parts of freshly distilled thionyl chloride for 2–4 hours under reflux, during which dissolution gradually occurs. The excess of thionyl chloride is then distilled off in vacuo and the distillation residue is stirred with water. The mixture is filtered with suction, and the residue is washed with water until neutral and recrystallized from ethanol. There is obtained 2:5-bis-[2'-hydroxyphenyl-(1')]-1:3:4-oxdiazole of the formula

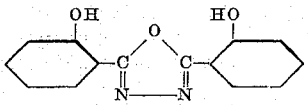

in the form of colorless small needles, which exhibit an intense yellow fluorescence when exposed to ultraviolet rays and melt at 203–204.5° C.

The product can be used as follows:

1.5 part of 2:5-bis-[2'-hydroxyphenyl-(1')]-1:3:4-oxdiazole are incorporated in a normal stabilized mixture of 200 parts of polyvinyl chloride and 100 parts of dioctyl phthalate as plasticiser. After being gelatinized on a hot calender for 5 minutes at 150° C. there is obtained a foil, which is completely opaque to ultraviolet rays in the region of 300–410 mμ whereas a foil produced without the addition of the oxdiazole compound is transparent to these rays.

*Example 6*

26.0 parts of hydrazine sulfate and then 55.2 parts of salicyclic acid are slowly added to 193 parts of oleum, (27% SO₃), while stirring and cooling, in such manner that the temperature does not exceed 20° C. The temperature is then raised to 60° C. in the course of 30 minutes and stirring is continued for a further 6 hours first at 60–65° C. and then at 65°–70° C. The brown reaction solution is allowed to cool, poured on to ice, and stirred first in the cold and then at 70–80° C. The condensation product can be precipitated by the addition of sodium chloride. The product is filtered off with suction, washed with sodium chloride solution and dissolved in hot water. The resulting solution is rendered neutral with sodium carbonate, and the disodium salt of 2:5-bis-[sulfo-2'-hydroxyphenyl-(1')]-1:3:4-oxdiazole of the formula

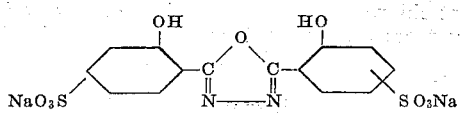

is precipitated by the addition of a salting-out agent, for example, sodium chloride. The product is filtered off with suction, washed with dilute sodium chloride solution and dried. It is a pale powder which dissolves in water.

By using, instead of the aforesaid salicyclic acid an equimolecular proportion of 4-hydroxybenzoic acid, 2:4-dihydroxybenzoic acid or 4-methyl-2-hydroxybenzoic acid there is obtained a product having similar properties.

The disodium salt of 2:5-bis-[sulfo-2'-hydroxy-phenyl-(1')]-1:3:4-oxdiazole can be used in the following manner as an absorber for ultraviolet rays:

0.3 part of the disodium salt of 2:5-bis-[sulfo-2'-hydroxyphenyl-(1')]-1:3:4-oxdiazole is added to 60 parts of an aqueous solution of 20 percent strength of polyvinyl alcohol. From this solution there is produced a colorless clear film, which absorbs the greater part of ultraviolet light of long wavelength.

By using, instead of the polyvinyl alcohol solution, an aqueous solution of 10 percent strength of gelatine there is obtained a film having similar properties.

*Example 7*

To a solution of 13.0 parts of hydrazine sulfate in 193 parts of oleum (27% SO₃), 41.4 parts of 3,5-dichloro-2-hydroxy-1-benzoic acid are added, while cooling, in such manner as not to allow the temperature to rise above 25° C. When the addition is complete, the temperature is raised in the course of 30 minutes to 60–65° C. and the reaction mass is then stirred for 5–6 hours at 65–70° C. It is then allowed to cool, poured into ice water, and the resulting suspension is stirred with sodium chloride at 80° C. When the reaction mass has cooled off, it is filtered and the contents of the filter suspended in hot water. The suspension is given a neutral reaction with dilute sodium carbonate solution and salted out again with sodium chloride, the condensation product of the formula

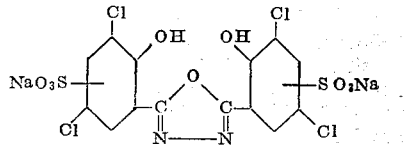

separating. The product is cooled to room temperature, filtered, washed with dilute sodium chloride solution and dried to obtain a pale powder.

When, instead of 41.4 parts of 3,5-dichloro-2-hydroxy-1-benzoic acid, there are used 34.4 parts of 5-chloro-2-hydroxy-1-benzoic acid, the condensation product obtained is the disodium salt of the formula

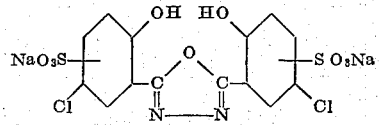

in the form of a pale powder.

The condensation products of the above formulae can be used as absorbers for ultraviolet rays. In addition, they have a good affinity for wool fibers and protect wool very well against moths.

*Example 8*

44.2 parts of 3,5-dichloro-2-hydroxy-1-benzoic acid-monohydrazide are suspended in 400 parts by volume of toluene. To the suspension obtained are added 48.4 parts of m-sulfo-benzoylchloride and the temperature slowly raised to the boiling point of the toluene. The reaction mass is then refluxed for 5–6 hours, at the end of which the evolution of hydrochloric acid ceases. In the course of 30 minutes, 28 parts of thionyl chloride are added and the reaction mass refluxed for another 12 hours. It is then cooled to room temperature, filtered, washed with toluene and dried. The crude product is dissolved in a little more than the calculated quantity of dilute sodium hydroxide solution at 60–70° C., filtered to remove traces of undissolved matter and the condensation product of the formula

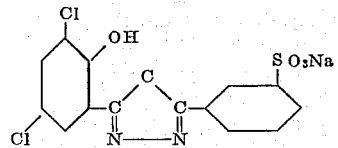

is caused to separate by the addition of a salting-out agent, such as e. g. sodium chloride. The product is cooled, filtered, washed with dilute sodium chloride solution and dried. The condensation product can be used as an absorber for ultra-violet light and as moth proofing agent for wool.

The monohydrazide of 3,5-dichloro-2-hydroxy-1-benzoic acid used as starting material can be prepared by boiling 3,5-dichloro-2-hydroxy-1-benzoic acid methyl ester for several hours with an excess of hydrazine hydrate in alcohol (colorless needles of melting point 228–231° C.).

*Example 9*

Wool muslin is treated for 30 minutes at 90–95° C. at a liquor ratio of 1:40 in a bath containing, calculated on the weight of the fiber, 5% of sulfuric acid and 3% of the compound obtained according to Example 7. The wool is then rinsed well and dried.

The protection against moths was tested according to the standards of the Schweizerischen Verbandes für Materialprüfung der Technik (SVMT–A–3001) (Swiss Association for Testing Technical Materials) with larvae of *Tineola biseliella*. Wool muslin impregnated with 3% of the compound was found to be mothproof.

What is claimed is:

1. An oxdiazole which corresponds to the formula

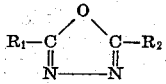

in which each of the radicals $R_1$ and $R_2$ represents a member selected from the group consisting of hydroxynaphthyl, hydroxyphenyl, dihydroxyphenyl, hydroxyphenyl-monosulfonic acid, hydroxy-dichlorophenyl, hydroxy - chlorophenyl - monosulfonic acid, hydroxy - dichlorophenyl-monosulfonic acid, hydroxy-methylphenyl-monosulfonic acid, dihydroxyphenyl-monosulfonic acid, phenyl, chlorophenyl and phenyl-monosulfonic acid, and at least one of the radicals $R_1$ and $R_2$ contains a hydroxyl group and is bound to the oxdiazole radical in ortho-position to said hydroxyl group.

2. The oxdiazole of the formula

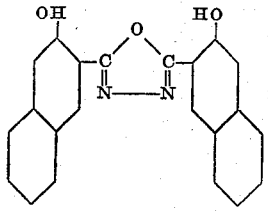

3. The oxdiazole of the formula

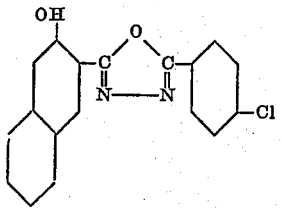

4. The oxdiazole of the formula

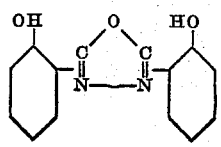

5. The oxdiazole which in its free acid state corresponds to the formula

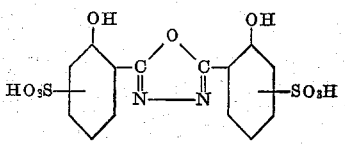

6. The oxdiazole which in its free acid state corresponds to the formula

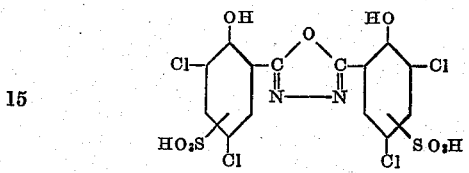

References Cited in the file of this patent
UNITED STATES PATENTS
2,765,304    Siegrist et al. _____ Oct. 2, 1956

FOREIGN PATENTS
1,080,106    France _____ May 26, 1954

OTHER REFERENCES
Stolle: J. für. prakt. Chem., vol. 182, pages 15–24 (1906).
Aspelund: Chem. Abst., vol. 28, col. 5443 (1934).
Labriola et al.: Chem. Abst., vol. 39, col. 1405 (1945).

UNITED STATES PATENT OFFICE

Certificate of Correction

Patent No. 2,838,520 June 10, 1958

Willy Mueller et al.

It is hereby certified that error appears in the printed specification of the above numbered patent requiring correction and that the said Letters Patent should read as corrected below.

Column 7, lines 26 to 28, lower left-hand portion of the formula, the "NaO₃S" group should extend into the ring; column 8, lines 38 to 41, center portion of the formula, for

Signed and sealed this 2nd day of December 1958.

[SEAL]

Attest:
KARL H. AXLINE,
Attesting Officer.

ROBERT C. WATSON,
Commissioner of Patents.